United States Patent Office 3,086,916
Patented Apr. 23, 1963

3,086,916
PROCESS FOR PRODUCING L-GLUTAMIC ACID FROM RACEMIC GLUTAMIC ACID
Shukuo Kinoshita, Masao Tanaka, and Yo Kato, Tokyo, Japan, assignors to Kyowa Hakko Kogyo Co., Ltd., Tokyo, Japan, a corporation of Japan
No Drawing. Filed Aug. 2, 1961, Ser. No. 128,695
12 Claims. (Cl. 195—29)

The present invention relates to a process for producing L-glutamic acid from racemic glutamic acid by use of a specific combination of enzymatic materials. More particularly, it deals with a process for producing L-glutamic acid from racemic glutamic acid by causing a dehydration reaction of L-glutamic acid with enzymatic action of a strain of Pseudomonas cruciviae or its mutant, and by causing, at the same time, a racemization reaction of optically active glutamic acid with an enzymatic material produced from a strain belonging to the Lactobacillus group, thereby converting the racemic glutamic acid to L-glutamic acid.

An object of the present invention is to provide a process for producing L-glutamic acid having a higher purity by an easy procedure in a short period of time with a high yield, excluding such complicated procedure as optical resolution. Other objects will be apparent from the description which follows.

Production of L-glutamic acid from racemic glutamic acid has heretofore been conducted by physically or biochemically resolving racemic glutamic acid into L- and D-glutamic acids or their derivatives, racemizing the D-glutamic acid remaining after the separation of the resolution products, and further resolving the racemized glutamic acid, thus repeating the same procedure. Such conventional processes, however, have various difficulties from technical and economical viewpoints, since such repeated procedures are extremely complicated and require a long period of time; a low yield of L-glutamic acid is unavoidable.

The present inventors have suggested a process for producing L-glutamic acid from racemic glutamic acid in Japanese patent application No. 28,885/1959, the gist of which is in converting racemic glutamic acid into L-glutamic acid by a dehydration reaction of L-glutamic acid with a strain of Pseudomonas cruciviae or its mutant (strain) in the presence of an aromatic aldehyde and a metallic ion, the former having a radical co-ordinatable with a metal. Because the racemization of glutamic acid is effected by an aromatic aldehyde and a metallic ion in this process, an amino radical rearrangement reaction tends to take place along with the racemization reaction according to the condition of the procedure. Part of the glutamic acid is thereby converted to α-ketoglutaric acid, resulting in a loss of yield of glutamic acid. Besides, the activity of glutamic acid dehydrase is inclined to be lowered in a small degree.

The present inventors conceived the idea that the use of an enzyme would be the best way for specifically effecting the racemization, and have searched a racemase-yielding strain. Consequently, extremely powerful glutamic acid racemase-yielding strains have been found and isolated. Thus, an exceedingly superior process is accomplished, wherein racemic glutamic acid is converted to L-glutamic acid utilizing the enzymatic action of glutamic acid racemase yielded by such strains.

With respect to enzyme racemization of amino acids, there has been some research on alanine. (See Journal of Biological Chemistry, 190, 403 [1951] and Archives of Biochemistry and Biophysics 49, 168, [1954].) As for glutamic acid, however, there are merely short reports of Narrod, Ayengar et al. (see Archives of Biochemistry and Biophysics, 35, 462 [1952], and Journal of Biological Chemistry, 197, 453, [1952]), but details of the research are not apparent.

The present inventors have found that strains belonging to the Lactobacillus group, such as Lactobacillus fermenti, Lactobacillus arabinosus, Lactobacillus delbrückii, and the like have powerful glutamic acid racemase activity. It has thus been found (a) that enzymatic materials produced from these strains, such as lyaphilized solid cells, acetone-dried solid cells, cell homogenates obtained by supersonic vibration, cell suspensions, and the like, specifically act for racemization of glutamic acid, (b) that there is no change in the total amount of glutamic acid after the reaction by their use under whatever reaction conditions are employed, and (c) that they do not racemize 2-pyrrolidone-5-carboxylic acid.

The reaction concerned is exemplified in Table 1 with respect to actone-dried solid cells of Lactobacillus fermenti strain using a solution containing D-glutamic acid and L-2-pyrrolidone-5-carboxylic acid.

TABLE 1

Racemization Ratios of D-Glutamic Acid and L-2-Pyrrolidone-5-Carboxylic Acid

| Reaction period (hour) | D-glutamic acid | L-2-pyrrolidone-5-carboxylic acid |
|---|---|---|
| 0 | 0 | 0 |
| 1 | 65.0 | 0 |
| 2 | 82.1 | 0 |
| 3 | 95.2 | 0 |
| 4 | 98.7 | 0 |

Furthermore, the present inventors have found that both of glutamic acid-racemase and L-glutamic acid-dehydrase are powerful and do not affect each other when they coexist, and, besides, that the actions of both enzymes help each other through continuous movement of reaction equilibrium when the both reactions take place at the same time. Thus racemic glutamic acid is rapidly converted to L-2-pyrrolidone-5-carboxylic acid, which is easily converted to L-glutamic acid by hydrolysis in a high yield. Accordingly, the present invention provides for the first time an extremely advantageous process for commercially producing L-glutamic acid from racemic glutamic acid.

To produce L-glutamic acid from racemic glutamic acid in accordance with the invention, an enzymatic material produced from a strain of glutamic acid-recemase yielding bacteria belonging to Lactobacillus and an enzymatic material prepared from a strain of Pseudomonas cruciviae are added to an aqueous solution containing racemic glutamic acid. The L-glutamic acid in the solution is dehydrated by the enzymatic action, and rapidly converted to L-2-pyrrolidone-5-carboxylic acid. At the same time, the remaining D-glutamic acid is racemized through the movement of reaction equilibrium, and changed to racemic glutamic acid. The L-glutamic acid newly yielded by the racemization is readily dehydrated to L-2-pyrrolidone-5-carboxylic acid. The racemization reaction is extremely rapid. The dehydration reaction of L-glutamic acid is also exceedingly rapid, since the proportional amount of L-glutamic acid against the enzyme is always so small that the enzymatic action is effective. Thereby, the mutual action of both reactions of conversion of L-glutamic acid to L-2-pyrrolidone-5-carboxylic acid and of racemization of D-glutamic acid permits the whole conversion of racemic glutamic acid to L-2-pyrrolidone-5-carboxylic acid in a short period of time. L-2-pyrrolidone-5-carboxylic acid thus obtained readily yields L-glutamic acid by hydrolysis. For production of L-glutamic acid from racemic glutamic acid in accordance with the invention, the preferred concentration of the racemic glutamic acid in the reaction mixture is about 20 to 50 mg./ml. The pH of the reactive mixture at the beginning is preferably about 7.5. The preferred temperature of the reaction is from 37 to 40° C. Usually a reaction period ranging from 4 to 12 hours suffices to obtain substantially quantitative yields.

The separation of the resulting L-2-pyrrolidone-5-carboxylic acid from the remaining D-glutamic acid may be conducted by any of the conventional procedures; employing such an ion-exchange resin as may adsorb glutamic acid alone and no 2-pyrrolidone-5-carboxylic acid is preferred. For instance, when an acidic reaction mixture having a pH of not more than 3.2 is passed through strongly acidic cation exchange resin, such as H-cycle sulfonated polystyrene type resin, the remaining D-glutamic acid is adsorbed on the said resin while only 2-pyrrolidone-5-carboxylic acid remains in the effluent. Thus, both D-glutamic acid and 2-pyyrolidone-5-carboxylic acid may be separated.

The hydrolysis of the separated L-2-pyrrolidone-5-carboxylic acid may be carried out using aqueous acid or alkali solution in conventional procedure, the detailed explanation of which is unnecessary since it is apparent to those skilled in the art.

The present invention will more fully be explained with respect to the following examples, which are provided by way of illustration, and not by way of limitation.

EXAMPLE 1

To a solution containing 100 g. of racemic glutamic acid and adjusted to pH 7.5, there are added 2 g. of dried solid cells of *Lactobacillus fermenti* and 2 g. of dried solid cells of *Pseudomonas cruciviae*. The glutamic acid in the solution is converted almost completely to L-2-pyrrolidone-5-carboxylic acid after being allowed to react at the temperature of 40° C. for 4 hours. The pH is adjusted to 2.0 after the termination of the reaction. The solution is passed through a column filled with 100 g. of strongly acidic ion exchange resin having previously been regenerated with 10% hydrochloric acid and then washed, thereby unreacted D-glutamic acid being removed by adsorption. The effluent is concentrated and, at the same time, hydrolyzed, followed by filtration. The pH of the filtrate is adjusted to 3.2, and the crystals isolated are separated therefrom, and are dried to yield 97 g. of L-glutamic acid. Further 1.5 g. of L-glutamic acid are recovered by concentration of the mother liquor.

EXAMPLE 2

To a solution containing 82 g. of racemic glutamic acid, there is added 1 g. of acetone-dried solid cells of *Lactobacillus arabinosus* and 300 mg. of a crude enzymatic material produced from *Pseudomonas cruciviae* at the pH of 7.5. The glutamic acid in the solution is substantially completely converted to L-2-pyrrolidone-5-carboxylic acid after being allowed to react at the temperature of 37° C. for 6 hours. The reaction liquor is processed as in Example 1, and the crystals isolated at the pH of 3.2 are separated and dried, to yield 81.1 g. of L-glutamic acid.

EXAMPLE 3

To a solution containing 28 g. of racemic glutamic acid, there is added a crude enzymatic material obtained by supersonic vibration of 2 g. of solid cells of *Lacto bacillus delbrückii* and 500 mg. of dried solid cells of *Pseudomonas cruciviae*. After a reaction at a temperature of 35° C. for 12 hours, and a treatment of the resulting reaction liquor as in Example 1, 26.6 g. of L-glutamic acid are yielded.

What we claim is:

1. A process for producing L-glutamic acid from racemic glutamic acid, which comprises adding an enzymatic material produced by cultivation of a glutamic acid-racemase-yielding bacteria belonging to Lactobacillus group and an enzymatic material produced by cultivation of a strain of *Pseudomonas cruciviae* (including its mutant strains) to an aqueous solution containing racemic glutamic acid, thereby causing a reaction to convert the glutamic acid to L-2-pyrrolidone-carboxylic acid, and hydrolyzing the resulting L-pyrrolidone-5-carboxylic acid, and recovering L-glutamic acid from the hydrolysate.

2. A method of producing L-glutamic acid from racemic glutamic acid which comprises (A) subjecting an aqueous solution containing racemic glutamic acid (1) to the action of at least one member selected from the group consisting of *Lactobacillus fermenti*, *Lactobacillus arabinosus* and *Lactobacillus delbrückii* and (2) to the action of *Pseudomonas cruciviae*, thereby converting the racemic glutamic acid to L-2-pyrrolidone-5-carboxylic acid, (B) hydrolyzing the resulting L-2-pyrrolidone-5-carboxylic acid, and (C) recovering L-glutamic acid from the hydrolyzate.

3. A method of producing L-glutamic acid from racemic glutamic acid which comprises (A) bringing (1) an aqueous solution containing racemic glutamic acid into contact with (2) an aqueous suspension of a microorganism selected from the group consisting of *Lactobacillus fermenti*, *Lactobacillus arabinosus* and *Lactobacillus delbrückii* and with (3) *Pseudomonas cruciviae*, whereby the racemic glutamic acid is converted to L-2-pyrrolidone-5-carboxylic acid, (B) hydrolyzing the resulting L-2-pyrrolidone-5-carboxylic acid, and (C) recovering the L-glutamic acid from the hydrolyzate.

4. A method of producing L-glutamic acid from racemic glutamic acid which comprises (A) bringing (1) an aqueous solution containing racemic glutamic acid into contact with (2) cells of a microorganism selected from the group consisting of *Lactobacillus fermenti*, *Lactobacillus arabinosus* and *Lactobacillus delbrückii* and with (3) *Pseudomonas cruciviae*, whereby the racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

5. A method of producing L-glutamic acid from racemic glutamic acid which comprises (A) bringing (1) an aqueous solution containing racemic glutamic acid into contact with (2) cell homogenate of a microorganism selected from the group consisting of *Lactobacillus fermenti*, *Lactobacillus arabinosus* and *Lactobacillus delbrückii* and with (3) *Pseudomonas cruciviae*, whereby the racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

6. A method of producing L-glutamic acid from racemic glutamic acid which comprises (A) bringing (1) an aqueous solution containing racemic glutamic acid into contact with (2) enzyme of a microorganism selected from the group consisting of *Lactobacillus fermenti*, *Lactobacillus arabinosus* and *Lactobacillus delbrückii* and with (3) *Pseudomonas cruciviae*, whereby the racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

7. A method of producing L-glutamic acid from racemic glutamic acid which comprises (A) bringing (1) an aqueous solution containing racemic glutamic acid into contact with (2) enzyme of a microorganism selected from the group consisting of *Lactobacillus fermenti*, *Lactobacillus arabinosus* and *Lactobacillus delbrückii* and with (3) enzyme of *Pseudomonas curciviae* at a temperature of from 37° to 40° C., whereby the racemic glutamic acid is converted to L-2-pyrrolidone-5-carboxylic acid, (B) hydrolyzing the resulting L-2-pyrrolidone-5-carboxylic acid and (C) recovering L-glutamic acid from the hydrolyzate.

8. A method of producing L-glutamic acid from racemic glutamic acid which comprises (A) bringing (1) an aqueous solution containing racemic glutamic acid into contact with (2) enzyme of a microorganism selected from the group consisting of *Lactobacillus fermenti, Lactobacillus arabinosus* and *Lactobacillus delbrückii* and with (3) enzyme of *Pseudomonas curciviae* at a pH of about 7.5, whereby the racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

9. A method of producing L-glutamic acid from racemic glutamic acid which comprises (A) forming a reaction mixture of (1) an aqueous solution containing racemic glutamic acid, (2) an aqueous suspension of a microorganism selected from the group consisting of *Lactobacillus fermenti, Lactobacillus arabinosus* and *Lactobacillus delbrückii* and (3) *Pseudomonas cruciviae*, the concentration of racemic glutamic acid in the reaction mixture being from 20 to 50 milligrams per milliliter, whereby said racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

10. A method of producing L-glutamic acid from racemic glutamic acid which comprises (A) subjecting an aqueous solution containing racemic glutamic acid (1) to the action of a member selected from the group consisting of *Lactobacillus fermenti* and enzyme thereof and (2) to the action of a member selected from the group consisting of *Pseudomonas cruciviae* and enzyme thereof, whereby the racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

11. A method of producing L-glutamic acid from racemic glutamic acid which comprises (A) subjecting an aqueous solution containing racemic glutamic acid (1) to the action of a member selected from the group consisting of *Lactobacillus arabinosus* and enzyme thereof and (2) to the action of a member selected from the group consisting of *Pseudomonas cruciviae* and enzyme thereof, whereby the racemic glutamic acid is converted to L-2-pyrrolidone-5-carboxylic acid, (B) hydrolyzing the resulting L-2-pyrrolidone-5-carboxylic acid, and (C) recovering L-glutamic acid from the hydrolyzate.

12. A method of producing L-glutamic acid from racemic glutamic acid which comprises (A) subjecting an aqueous solution containing racemic glutamic acid (1) to the action of a member selected from the group consisting of *Lactobacillus delbrückii* and enzyme thereof and (2) to the action of a member selected from the group consisting of *Pseudomonas cruciviae* and enzyme thereof, whereby the racemic glutamic acid is converted the resulting L-2-pyrrolidone-5-carboxylic acid, (B) hydrolyzing the resulting L-2-pyrrolidone-5-carboxylic acid, and (C) recovering L-glutamic acid from the hydrolyzate.

References Cited in the file of this patent

UNITED STATES PATENTS

| | | |
|---|---|---|
| 3,003,921 | Kinoshita et al. | Oct. 10, 1961 |
| 3,003,922 | Kinoshita et al. | Oct. 10, 1961 |
| 3,003,923 | Kinoshita et al. | Oct. 10, 1961 |